United States Patent [19]
Petrick

[11] Patent Number: 5,712,870
[45] Date of Patent: Jan. 27, 1998

[54] PACKET HEADER GENERATION AND DETECTION CIRCUITRY

[75] Inventor: Al Petrick, Orlando, Fla.

[73] Assignee: Harris Corporation, Melbourne, Fla.

[21] Appl. No.: 509,462

[22] Filed: Jul. 31, 1995

[51] Int. Cl.⁶ ............................................. H04B 15/00
[52] U.S. Cl. .................... 375/206; 375/200; 375/279; 375/308; 370/206; 370/320
[58] Field of Search ........................ 375/200, 206, 375/207, 208, 219, 220, 261, 298, 279, 280, 308, 329, 364, 367, 332; 370/206, 207, 320, 335, 342, 349, 350, 465, 466, 474

[56] References Cited

U.S. PATENT DOCUMENTS

| | | | |
|---|---|---|---|
| 5,179,574 | 1/1993 | Watanabe et al. | 375/200 |
| 5,371,734 | 12/1994 | Fischer | 370/331 |
| 5,377,232 | 12/1994 | Davidov et al. | 375/206 |
| 5,553,095 | 9/1996 | Engdahl et al. | 375/222 |
| 5,596,600 | 1/1997 | Dimos et al. | 375/206 |

*Primary Examiner*—Wellington Chin
*Assistant Examiner*—Congvan Tran
*Attorney, Agent, or Firm*—Rogers & Killeen

[57] ABSTRACT

A method and apparatus for receiving and transmitting direct sequence spread spectrum signals uses a single integrated device for converting and demodulating an RF signal into a serial data signal. Critical timing relationships during the acquisition and demodulation of the received signal are satisfied by the use of an integrated circuit specially designed to perform all operations needed to convert the physical signal to an media access circuit level data signal.

20 Claims, 3 Drawing Sheets

PACKET HEADER GENERATION AND DETECTION CIRCUITRY

BACKGROUND OF THE INVENTION

The present invention is related generally to receivers for acquiring radio-frequency signals and, particularly, to receivers for acquiring data from signals which may have been transmitted in a spread spectrum system.

Wireless systems have been developed and proposed in the prior art in which plural radio frequency ("RF") transmitters send bursts of messages to a receiver which must acquire the signal from each transmitter and decode the data contained therein. For example, in a wireless Local Area Network ("LAN") plural nodes which are not necessarily geolocated together may each communicate with a base station (or even with each other) and transmit data to and from the base station for the use by applications located at the nodes. Because the system is wireless, the transmissions are made using the ether. In simple systems, a base station may be able to communicate with only a single remote node during any given time period. Obviously, such an arrangement limits the amount of data which can be passed between the nodes and the base station in a given period of time. To increase the amount of data which may be transmitted, it is known for a wireless system to use plural distinct frequencies the use of which is arbitrated or determined by the system. In this way, several remote nodes may be transmitting to or receiving data from the base station simultaneously. Such systems tend to use a relatively large bandwidth of the available spectrum and are relatively expensive in forcing the base station to have plural transceivers and for the nodes to be capable of communicating on plural frequencies. In addition, in such prior art systems, the allocation of frequencies for communications may consume a relatively large portion of the available processing resources and degrade the ability of the system to communicate data. In still other prior art systems, the various nodes and the base station may use a time-division multiplex protocol in which a base unit allots periods of time to nodes requiring data communications and controls the communication by the nodes during the assigned time periods. Again, the overhead in processing resources needed to manage the system and the consumption of communication resources by control messages may be relatively high for such systems.

Another means by which plural remote nodes may communicate with a base station or other nodes is the use of PN-encoded spread spectrum technology. In a typical spread spectrum signal, the signal to be transmitted is modulated with a pseudorandom noise ("PN") code. Demodulating such a signal generally involves the demodulating of a received signal by the same PN code as was used to modulate the signal. Once the signal is demodulated, it may be correlated to ensure that an actual signal was present, and subsequently demodulated/decoded to extract the data. One of the benefits of such spread spectrum systems is that multiple nodes may be simultaneously transmitting without necessarily destroying each other's signals. Thus, some of the inter-nodal timing problems of other prior art systems are reduced. The use of such spread spectrum systems is also often beneficial to the ability of the receiver to acquire and decode the signal in high noisy environments.

In spread spectrum signal communications, as in many wireless communications systems, it is often desirable to communicate between nodes and the base station in short, bursty packets of data. Bursty communications generally permits many nodes (which often have bursty communications needs) to be joined in a system without significant degradation at any one node, i.e., each node receives an opportunity to communicate within a desired latency period. Thus, in some communications systems, it is desirable to have messages be relatively short to ensure that each node has an opportunity to communicate within an acceptable latency period.

Typical spread spectrum messages generally include a data portion containing the data to be transmitted preceded by a preamble or header portion used for synchronization of the receiver to the signal being transmitted and a check portion (often a Cyclical Redundancy Check, CRC) which provides signals whereby the correctness of the decoded message may be determined. Particularly when data messages are desired to be bursty, and thus short, the length of the preamble may be significant in determining the data bandwidth of the system or the amount of data which can be communicated within a particular period of time. Generally, the smaller the preamble for a system having a particular speed, the greater is the available data bandwidth. Short preambles, however, generally provide the receiver with less information on which to synchronize.

In a typical wireless LAN using bursty communications, the system can be characterized as having multiple bursts from various transmitters, each of which must be acquired and decoded by the receiver. The problems of acquiring such signals is made all the more difficult if, as is sometimes the case, the plural nodes provide communication signals having varying signal strengths and signal to noise ratios and if the start of the communications from the various nodes is not synchronous. Often in such wireless LAN systems, the receiver has no apriori knowledge of the time of the start of a communication, or the particular off-nominal characteristics of the sending node. Each sending node, for example, may have a different frequency offset or frequency drift which affects how its signal must be acquired and/or decoded.

In prior art systems, baseband processors were typically used to extract data from PN modulated spread spectrum signals (and to modulate a signal to be transmitted with PN modulation). Typical prior art baseband processors used a symbol length matched filter correlator, with the output acquired by a phase locked loop, to remove the offset frequency of the carrier. In such systems, the matched filter is set to match the PN code sequence used for the spread spectrum link. Generally, in such prior arts systems, acquisition of the signal is declared based on the amplitude of the correlation output peaks from the matched filter. The disadvantage of this typical prior art approach is that the phase locked loop is relatively slow and may have large amounts of jitter if the signal is near the noise level. If the presence of the signal is falsely declared on the basis of the noise, the desired signal may be rejected. In addition, the slow acquisition may preclude the use of a diversity of antennas, particularly where the message preamble is relatively short in duration. In some prior art systems, plural parallel receive paths are used for the diverse antennae so that each antenna may be evaluated in parallel. Obviously, such duplication of elements is relatively expensive in terms of cost, power and area.

Another aspect which influences the design and operation of prior art baseband processors involves the A/D sampling of the baseband signal. A low cost direct sequence baseband demodulator utilizes as few bits as possible in the A/D sampling converter used to sample the I and Q signals while maintaining acceptable system performance. Each bit of an additional A/D flash converter approximately doubles the number of comparators needed. Additionally, in the light of the fact that the A/D converter will experience several dB of variation at the Rf and IF chain because of variances in manufacturing tolerances and temperature effects, unless means are taken to eliminate the effects of these variances, up to one-half the dynamic range of a prior art A/D device may become unavailable.

One prior art solution to the problems of dynamic range in a direct sequence spread spectrum system is to increase the number of bits in the A/D converter until acceptable performance is achieved by the demodulator. The nominal signal level may then be set such that at the minimum signal level into the A/D converter, the required number of effective bits is met, and at the maximum signal level, saturation of the A/D converter is held to an acceptable level. The disadvantages of such an approach are generally seen in the additional size and corresponding cost of the A/D converter which would not be required for operation at nominal signal levels. Additionally, such approaches are generally disadvantageous in that the circuits following the A/D converter must also be designed to carry these additional bits, substantially increasing the amount of hardware and operational power requirements.

During signal acquisition and synchronization in direct sequence spread spectrum systems, it is usually necessary to adjust the timing of the receiving system to the bit timing of the received signal. By adjusting the timing, the receiving system can increase the probability that it is correctly acquiring and demodulating the correct signal. Many prior art systems used a voltage controlled oscillator ("VCO") to adjust the A/D sampling phase. This solution has the advantage of obtaining very fine sampling phase resolution but generally requires costly analog components. Another prior art solution has been to oversample the A/D input and use the closest samples. This solution, however, generally requires very fast and high power consumption A/D converters.

It is known in the prior art to demodulate a received direct sequence spread spectrum signal by using the in phase (I) and quadrature (Q) components from the correlator in the demodulator system and to use the bit synch amplitude to determine the signal quality. In such prior art systems, carrier frequency offset may be compensated for by the use of differential demodulation or by phase locked loop tracking of the carrier. Independent processing of both the I and Q components, however, generally requires twice the hardware through most of the signal processing path (one complete set of hardware for each signal component). In addition, in prior art systems, the phase locked loops can be relatively hardware intensive ad complex in order to achieve the speed necessary to acquire the short preambles of bursty communications.

Within the environment of a wireless LAN or other plural node system, it is desirable to be able to decode the communicated signals reliably: not permitting false data to be accepted as true and capturing with a high degree of probability the data which is transmitted. In addition, it is desirable to obtain such high performance while keeping relatively low the costs, sizes and power consumption of the hardware used in such systems.

Accordingly, it is an object of the present invention to provide a novel method and apparatus of acquiring a spread spectrum signal reliably and without false alarms.

It is another object of the present invention to provide a novel method and apparatus of acquiring a spread spectrum signal from one of plural transmitting nodes without prior knowledge of the time of the start of the signal.

It is yet another object of the present invention to provide a novel method and apparatus of acquiring a spread spectrum signal with a relatively small preamble in comparison to prior art systems.

It is still another object of the present invention to provide a novel method and apparatus of acquiring a spread spectrum signal from one or more of plural transmitters, having independent frequency and/or phase offsets.

It is a further object of the present invention to provide a novel method and apparatus of acquiring a spread spectrum signal in an environment having a relatively low signal to noise ratio and/or having a rapidly changing noise characteristic.

It is yet a further object of the present invention to provide a novel method and apparatus of acquiring a signal transmitted in accordance with the IEEE 802.11 standard.

It is still a further object of the present invention to provide a novel method and apparatus to acquire spread spectrum signals whether or not transmitted using the IEEE 802.11 standard.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
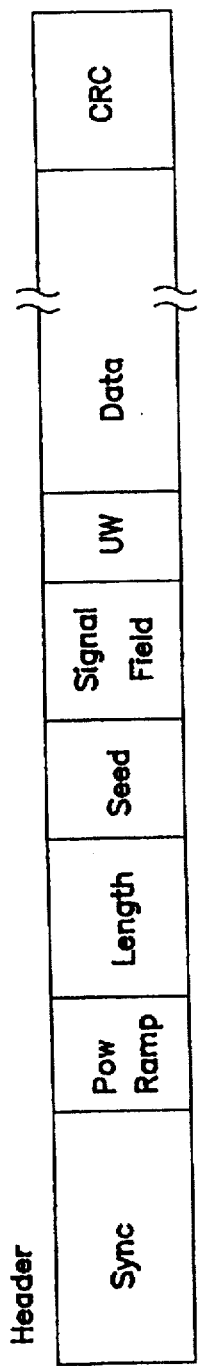
FIG. 1 is a representational diagram of the format of a type of signal which can be communicated in one embodiment of the present invention.

Standards have been proposed and are being developed for the communication of signals in a wireless LAN system. These standards include IEEE 802.11 typically utilize a short, bursty message format. As shown in FIG. 1, a typical message may consist of a fixed length preamble having the fields for power ramping, synchronization, a signal field, a descrambling seed, and a unique word. Immediately upon the end of the preamble, the data starts followed by a CRC field. As specified in IEEE 802.11, the preamble may be modulated onto the carrier signal using digital Binary Phase Shift Keyed ("BPSK") modulation. The data and CRC signals may be modulated using either BPSK or Quarternary Phase Shift Keyed modulation ("QPSK"). A transceiver in accordance with the present invention may readily acquire and decode the preamble, data and CRC portions of a standard message packet. However, the present invention is in no way limited to this one packet format and may be used in many other formats.

Figure 2:
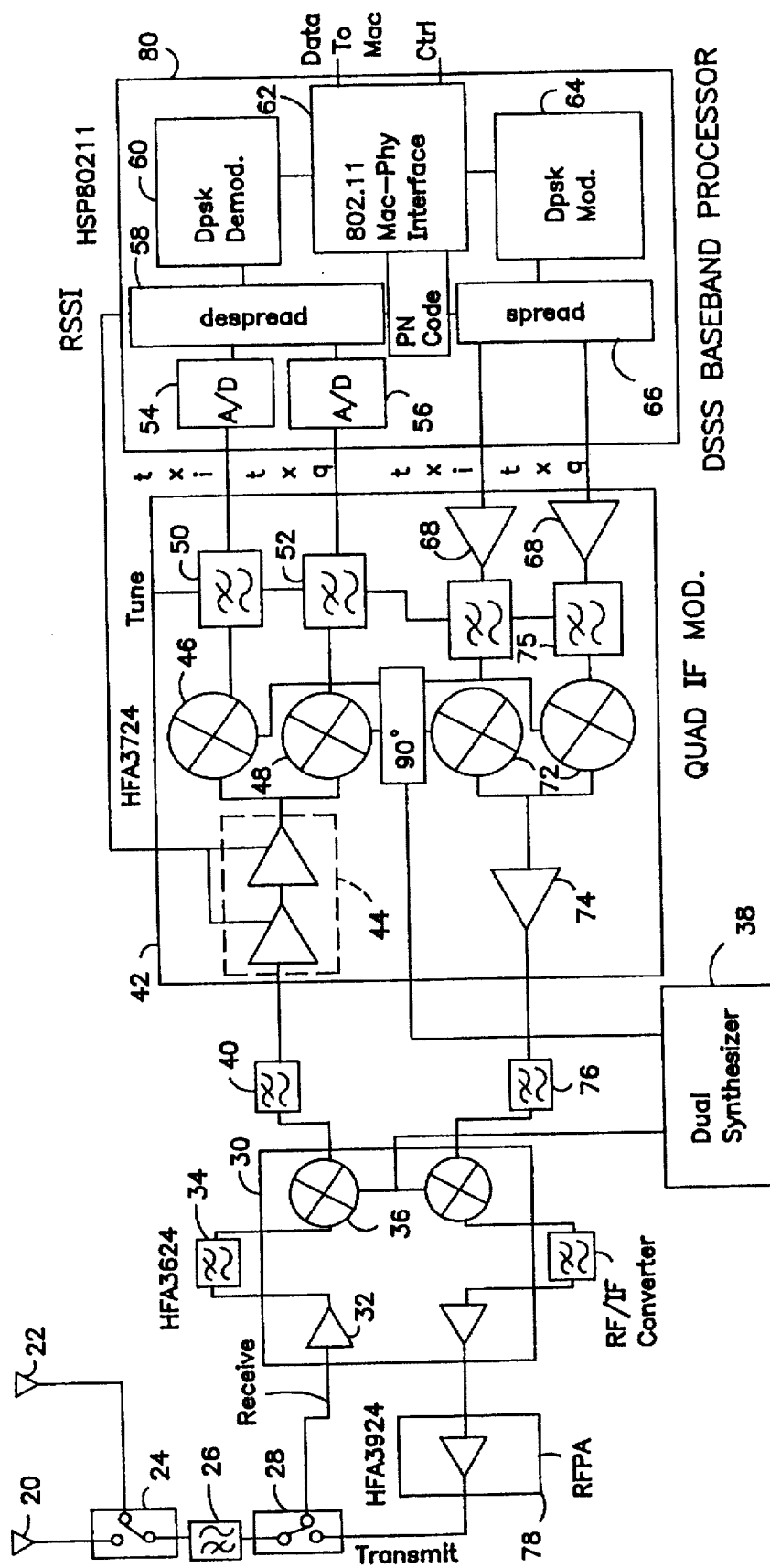
FIG. 2 is a functional block diagram of a communications transceiver which may be used in accordance with the present invention.

With reference to FIG. 2, a transceiver using one aspect of the present invention may include dual antennae 20, 22 which can be operatively connected to the remainder of the transceiver through a selector switch 24 and a conventional antenna coupler 26 which matches the impedance of the signal to/from the antennae 20, 22 to the transceiver. A second selector switch 28 connects the antenna coupler 26 to either a transmit circuit or a receive circuit of the transceiver. In the receive circuit, the second selector switch 28 is connected to an RF/IF converter 30 which amplifies the incoming signal through an amplifier 32, a bandpass filter 34 and a down conversion mixer 36. The down conversion mixer 36 also receives a clock signal from a synthesizer 38.

With continued reference to FIG. 2, the received signal exiting the RF/IF converter 30 may again be filtered to remove higher frequency signals therefrom in a second filter 40 and provided to a quadrature IF modulator/demodulator 42. Within the modulator/demodulator 42, the received signal may be passed through a two stage integrating limiting amplifier 44 which amplifies the received signal and provides a signal indicating the Received Signal Strength (RSSI) of the incoming signal. The amplified incoming signal may be split into I and Q (in-phase (real) and quadrature (imaginary)) components and mixed in dual mixers 46, 48 with a demodulating signal and a signal 90 degrees out of phase with the demodulating signal. Each of the mixed signals may be filtered by conventional antialiasing and shaping filters 50, 52 to provide two baseband signals, one of which is the I component and the other is the Q component of the intermediate frequency demodulated signal (RXI RXQ). (note that at this time, the received signal contains data which has been PN modulated (i.e., spread) and PSK modulated). The I and Q component signals may be provided to a baseband processor which converts the analog signals to digital signals at A/D converters and which despreads the spread spectrum signal through a despreader 58. The despread signal may be demodulated by a demodulator to provide a digital data signal which may be passed to an application system through an interface circuit 62.

With continued reference to FIG. 2, data to be transmitted may be received by the interface circuit 62 and then used to generate a spread spectrum modulated signal through a modulator 64 and a data spreader 66. The spread signal from the spreader 66, in the form of its I and Q components, may be amplified, filtered and modulated within the modulator/demodulator 42 by amplifiers 68, filters 70 and mixers 72. The modulated signal output from the mixers 72 may be amplified by an amplifier 74, filtered by a filter 76 and upconverted to RF by the RF/IF converter 30. The transmit signal output from the converter 30 may be power amplified by power amplifier 78 and then provided to one of the antennae, as selected by the switch 24.

In operation, a signal received at the antennae 20, 22 may be passed through the coupler 26. In one aspect of the present invention, each antennae may be used for a portion of the preamble of a message and the antenna receiving the better signal can be utilized to receive the data signal. Additional details regarding the antenna selection method and apparatus may be obtained from U.S. Pat. No. 5,694,417, entitled "Short Burst Acquisition Circuit for Direct Sequence Spread Spectrum Links" assigned to the same assignee as the present application and filed on even date herewith, which is incorporated herein by reference.

The signal received at the antennae may be provided to the receive portion of the RF/IF converter 30 and there be amplified by the amplifier 32, which may be a low noise amplifier. The amplified signal may be filtered by a bandpass filter, such as a filter centered at 2.5 GHz and having a 1 GHz RF frequency range. The filtered signal may be mixed in the mixer 36 with a downconversion signal to develop an Intermediate Frequency ("IF") signal. In an embodiment of the present invention, the downconversion signal may be a sinusoidal signal generated by a local synthesizer and may have a frequency in the range of 2.1 to 2.49 GHz. Thus, in one embodiment, the IF signal may have a range of from 10 to 400 MHz.

The RF/IF converter 30 may have independent enable and power circuits for each of the receive and transmit portions. By powering down the portions of the circuit not in use, the RF/IF converter 30 reduces the power consumption of the device and, significantly, provides isolation between the receive and transmit portions of the circuit. Such isolation may be particularly significant in time division multiplexed systems.

The receive signal output from the RF/IF converter 30 may be filtered through a bandpass filter 40 and provided to the quadrature IF modulator/demodulator 42 in which the signal is amplified in the two stage integrating limiting amplifier 44. The limiting amplifier 44 may include circuits to provide baseband antialiasing and shaping to the received signal. The limiting amplifier 44 may also provide a Receive Signal Strength Indicator (RSSI) signal to receive-downstream elements.

With continued reference to FIG. 2, after the receive signal has been amplified by the limiting amplifier 44, the signal may be split and each form of the resulting signal provided to the input the mixers 46, 48. One mixer mixes the receive signal by a locally synthesized periodic signal and the other mixer mixes the receive signal by a signal which is ninety degrees out of phase with the first periodic signal, as is well known in quadrature demodulation. The result of the signal mixing are two signals, one the I (in-phase or real) component of the demodulated receive signal and the other the Q (quadrature or imaginary) component of the demodulated receive signal. Note that if the receive signal is a spread spectrum PSK signal, the I and Q components signals are spread spectrum PSK modulated signals at the output of the mixers 46, 48. The I and Q component signals may each be filtered in tunable filters 50, 52.

In one embodiment of the present invention, the quadrature IF modulator/demodulator 42 may have a frequency range of between 10 to 400 MHz and the limiting amplifier 44 may provide in excess of 80 dB of gain.

In similar (but opposite) manner to the receive side of the quadrature IF modulator/demodulator 44, the transmit portion may amplify, filter and quadrature mix I and Q signals received from the baseband processor for transmission as a transmit signal. The transmit signal output from the transmit mixers 72 may be amplified, upconverted (by the RF/IF converter 30) and further amplified (by the power amplifier 78) to radiating power levels. The amplified transmit signal may thereafter be provided to one of the antennae 20, 22 after being impedance matched in the impedance matching circuit 26.

Figure 3:
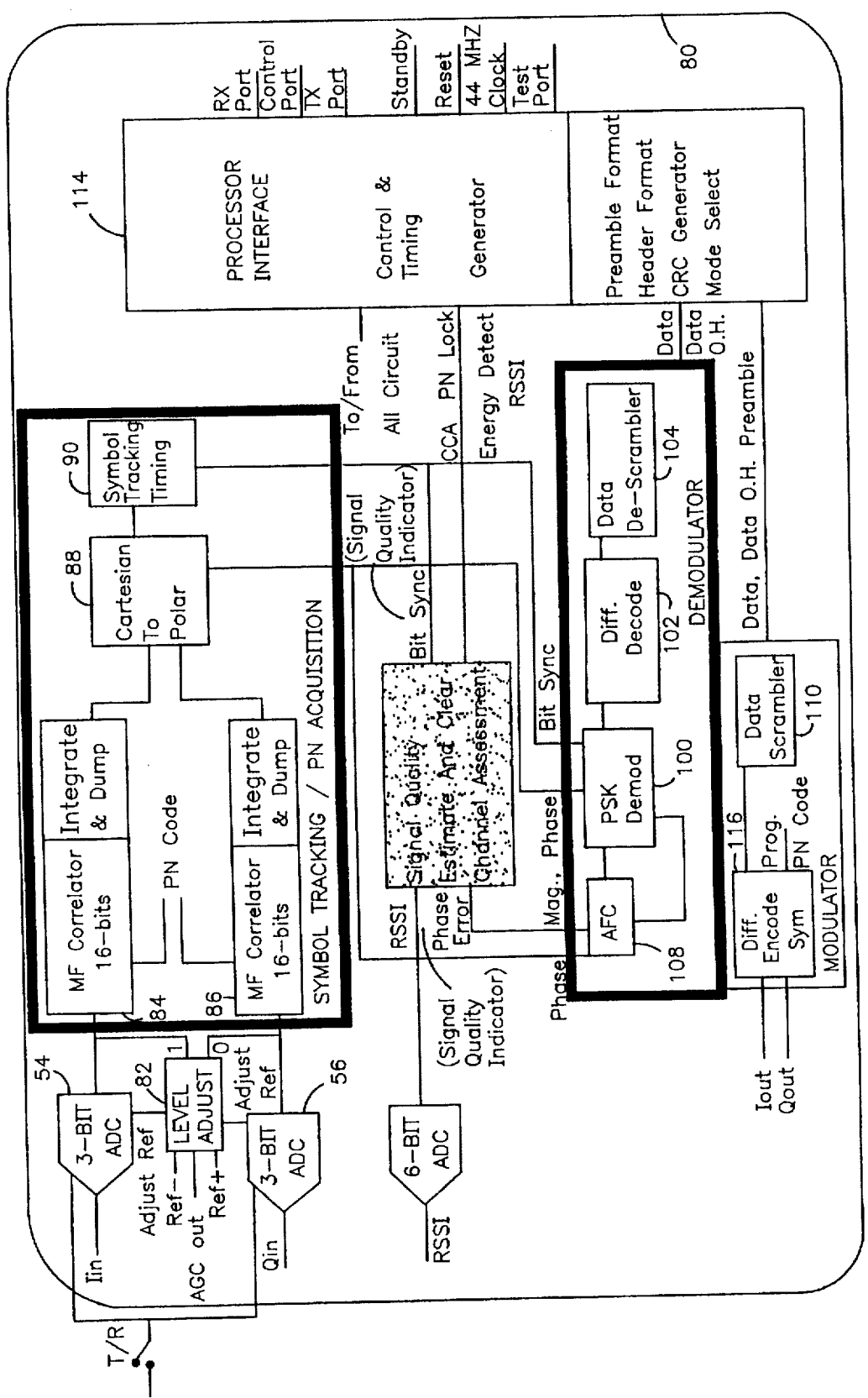
FIG. 3 is a functional block diagram of a baseband processor which may be used in the transceiver of FIG. 2.

With reference to FIG. 3, a baseband processor in accordance with the present invention may provide all of the functions necessary for spreading and despreading, modulating and demodulating, differential phase shift keyed signals ("DPSK") for full duplex data packet transmission. While the present invention is not necessarily limited to a single device, the performance of all of these functions on a single device provides substantial advantages over other designs in which these functions or portions of these functions are handled by plural hardware or software driven devices. These advantages include lower power requirements, better signal timing and synchronization, reduced device area and reduced cost.

With continued reference to FIG. 3, in which like reference numerals are used for like elements to those of FIG. 2, the baseband processor receives the I and Q signals from the modulator/demodulator 42 via the A/D converters 54, 56. The A/D converters are maintained in tolerance over a variety of conditions through a level adjust circuit 82. The A/D converters may be three bit converters which each provide their digital outputs to correlator circuits 84, 86 which acquire the signal of interest by detecting the pseudorandom noise ("PN") code in use for the particular spread spectrum link. The correlators 84, 86 may be matched filter correlators which (1) despread the wideband direct sequence spread spectrum ("DSSS") signal information to convert it back to the original data rate; and (2) spread unwanted interfering signals and noise to separate them spectrally from the data.

The correlators 84, 86 may receive a PN code of variable length, programmable up to 16 bits. The correlators 84, 86 are each dedicated to one of the component channels (I and Q) and have a common correlation reference which can be varied in both length and sequence to permit the system to be used to demodulate a wide variety of signal types. As is explained in more detail in the copending application entitled "SHORT BURST ACQUISITION CIRCUIT FOR DIRECT SEQUENCE SPREAD SPECTRUM LINES" filed on even date herewith, and incorporated herein by reference, the received signal may be sampled at twice the chip rate and the correlators have taps on every other stage. The output signal from the correlators are converted from I and Q form to polar form by a cartesian to polar converter 88. The polar form of the signal is used in the remainder of the demodulator processing, reducing the need for duplicate hardware for the independent I and Q channels.

A symbol tracking and timing circuit 90 is used to track the peak correlation magnitude and to control chip timing resolution to plus/minus one-quarter chip. The symbol tracking and timing circuit 90 can be a circuit such as described in more detail in "FAST ACQUISITION BIT TIMING LOOP METHOD AND APPARATUS", filed on even date herewith and incorporated herein by reference. The symbol tracking and timing circuit 90 averages the individual correlator samples over a desired period, such as the dwell period of the system on one of the antennae during the preamble. By averaging the samples, the effect of noise is reduced, permitting an improved ability to resolve a small early or late bias.

In the tracking and timing circuit 90, the magnitude of the correlator output ample are accumulated modulo the number of samples in a symbol. In this way, a sum of the correlator magnitudes is formed at each one sample phase of symbol timing. The best sample phase will produce a discernible peak with smaller samples on either side. All other samples will generally consist of accumulated noise and will be smaller in the sum of magnitudes. If the received signal is strong, the magnitudes provided by the correlator will be large and, in conventional designs, would have required an accumulator and other downstream equipment to maintain extra bits to prevent overflow. In contrast, in the present invention, overflow is prevented in large signals while maintaining accuracy on poor signals by barrel shifting the accumulations of magnitude when the largest value gets above one-half full scale. In one embodiment of the present invention, this value can be readily trapped by tracking the most significant bit ("MSB") of the accumulation. When the MSB of an accumulation is set to 1 (all numbers from the correlator are magnitudes and therefor positive), all of the accumulations and the subsequent outputs of the correlator are right shifted by one bit. The number of shifts may be counted and is similar in fashion to an exponent. Thus, the sample having the largest sum of magnitudes may be identified without adding extra bits to the accumulators and downstream equipment while maintaining, with the accumulator and exponent, and absolute indication of the strength of the received signal.

With continued reference to FIG. 3, the polar signal produced by the cartesian to polar converter 88 is provided to a PSK demodulator 100, and in turn to a differential decoder 102 and to a data descrambler 104. The PSK demodulator can demodulate both BPSK and QPSK signalling. In one aspect of the present invention, the preamble of a received signal may be in BPSK format and the data of the received signal may be in either BPSK or QPSK format. Because QPSK and BPSK signals are modulated differentially, the symbol information is based upon the state of the previous symbol. Phase errors introduced by multipath and oscillator offset drifts are compensated by a phase locked carrier tracking loop 108. In one embodiment, the loop uses an NCO providing eight bits of phase output to the PSK demodulator 100, and may be variously set to track and adjust for phase offset errors by rotation of the signal phase. The phase and frequency information developed during the preamble of a message is used to preset the loop 100 for minimum loop settling time.

With continued reference to FIG. 3, in one embodiment of the present invention, signal quality (SQ) and signal frequency (SF) measurements are made simultaneously with symbol timing measurements. When the bit synch level, signal quality (SG) and the Received Signal Strength Indicator (RSSI) are all above their respective thresholds, the received signal is declared present. As explained in detail in co-pending U.S. application Ser. No. 509,586, entitled "A METHOD OF ESTIMATING SIGNAL QUANTITY FOR A DIRECT SEQUENCE SPREAD SPECTRUM RECEIVER", filed on even date herewith and incorporated herein by reference, decisions as to which of two antennae would be used to receive data can be made after taking measurements during the dwell period for each antenna. Once a particular antenna is selected, the measured symbol timing and carrier frequency offset for the selected antenna is jammed into the symbol timing and into the phase-locked-loop of the NCO tracking the carrier to begin carrier de-rotation. In this way, the demodulating circuitry gets a "head start" in reacquiring and demodulating the incoming preamble data within the brief period desired for bursty communications.

The data descrambler 104 may be a self synchronizing circuit having programmable (or user settable) taps comprising 7 bit shift registers. For data to be transmitted, a similar data scrambler 110 is used. The data scrambler 110 can be selectively disabled for measuring RF carrier suppression, during which an alternating 1/0 pattern is transmitted. Likewise, the data descrambler may be selectively disabled to permit data to pass without change from the differential decoder 102 to the processor interface 114.

Data to be transmitted may be received from an external device by the processor interface 114. The processor interface 114 may generate a preamble, CRC and other protocols to be sent along with the data and to provide the data and other protocol signals to the data scrambler 110 and to a differential encoder 116 to develop PN modulated I and Q signals which can be provided to a quadrature IF modulator such as the modulator 42 of FIG. 2 for eventual transmission on an antenna.

Descrambled data may be provided to a processor interface 114 which may control the passage of the data to another device such as a media access control ("MAC") circuit.

With continued reference to FIG. 3, it has been found that placing the entire baseband processor onto a single chip can provide considerable benefit to accurate and timely demodulation of received signals and the extraction of data therefrom, particularly for bursty, brief data packets. As contrasted with the known prior art in which various of the portions of circuits similar to the circuits of the baseband processor of FIG. 3 have been provided by separate hardware devices and/or by separate complex programmable devices, the present invention is particularly suited to integration into a single device.

The baseband processor of FIG. 3 may be used to transfer packetized data received in the form of serial data in a physical layer to a media access control ("MAC") layer imbedded in the packetized data are header information used to control the physical layer. The header information may include fields of preamble/sync, unique word, signal field, service field, length field and a CRC field. The signal field is used to specify the signalling type used to modulate the data: either DPSK or QPSK. In one embodiment, the processor may receive data in which the header is in BPSK but the data is in QPSK. In such situations, the timing of switching the receiver from one signalling format to another is time critical. In another aspect of the present invention, the number of fields in the header may be user selectable.

It is known in the prior art that interfaces between the physical layer and the MAC level may be either serial or parallel. Most prior art implementations are parallel because the of the severe timing restrictions in which parallel circuits permit quicker timing but at the considerable additional expense of parallel hardware. Often the physical layer tasks of header generation and detection are done at the MAC layer, usually by separate devices. In contrast, in the present invention, all of the header detection and similar physical layer tasks may be imbedded into a single device.

In prior art devices where the header and similar physical layer tasks are handled by separate circuits/devices, there passes some period of time between when the circuit detects and demodulates an acceptable header and the transmission of that state to the circuit demodulating the data. In the preset invention, where the number of bits in the header is held to a minimum and may be used to determine which of plural antennae are to be used in addition to the other customary header functions, the slip of a single bit may mean the difference between successfully decoding a message and missing the message.

During demodulation of the header, the present invention monitors and uses the header data to both identify the type of signalling to be used for the data but to select between plural antennae. By using the data developed in the preamble for immediate data decoding, the number of lost bits is minimized. In receiving the header, the baseband processor converts the serial data from the data descrambler 104 into a 16 but parallel word which is compared with the preselected vales for the unique word and the signalling fields. The unique word is searched for a fixed amount of time and if it is not found, the modulator/demodulator is reset and acquisition of the RF signal is restarted. Once the unique word is found, a field counter searches through the incoming bits in a parallel fashion for the fields making up the header. As each fields is detected, the received data is stored into internal registers for access through the serial control bus the signalling field, when detected, is used to switch the receiver modulator/demodulator between BPSK and QPSK at the correct time with respect to the data portion of the packet. When the length field is detected, this value is loaded into a counter and is used to track the incoming bits of the data packet and to signal the MAC layer when the last bit of the packet is received. The processor interface 114 may also compute the CRC on the fly and compare the computed CRC to the CRC received within the message. If the CRCs do not match the receive data packet may be terminated and the receiver reset into reacquisition.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A circuit for detecting a message header in a signal which has been transmitted using direct sequence spread spectrum modulation, comprising a single device having:

means for receiving an analog signal having modulated thereon in a spread spectrum format a message having a header portion and a data portion;

means for converting said analog signal into a digital signal;

means for demodulating the header of the digital signal using digital binary phase shift keyed (BPSK) demodulation and for demodulating the data portion of the same message using quarterary phase shift keyed demodulation (QPSK);

means contained on said single device for timing a transition from BPSK mosulation to QPSK modulation; and, means for providing the demodulated data signal to a media access control (MAC) layer.

2. The circuit of claim 1 further comprising means for adjusting said means for timing to account for headers of variable length.

3. The circuit of claim 2 wherein said means for adjusting is contained within said single device and wherein said means for adjusting is responsive to a data field within said message header.

4. The circuit of claim 1 wherein said single device is a single monolithic device.

5. The circuit of claim 1 wherein said analog signal is in the form of in-phase and quadrature components.

6. The circuit of claim 5 wherein the data within said signal is modulated using PN modulation and phase shift keyed modulation.

7. The circuit of claim 5 further comprising means to evaluate during the header portion of the message the signals received from plural antennae and to select one of said antennae for use during the receipt of the data portion of the same message.

8. The circuit of claim 7 wherein the circuit is contained on a single monolithic device.

9. The circuit of claim 8 wherein said circuit acquires a unique word within a message header and if no unique word is acquired within a predetermined period of time resets the circuit.

10. In a communication system capable of receiving RF direct sequence spread spectrum signals, said system having a message header detection circuit comprising a single device having:

an analog receiver for receiving a spread spectrum modulated signal having a header portion and a data portion;

an analog-to-digital converter operable on said modulated signal;

a digital demodulator for binary phase shift keyed (BPSK) demodulation of said header portion and quaternary phase shift keyed (QPSK) demodulation of said data portion;

a timer for transitioning between the BPSK demodulation and the QPSK demodulation; and, an interface for providing the demodulated data signal to a media access control (MAC) layer.

11. The circuit of claim 10 wherein said timer is adjustable to account for headers of variable length.

12. The circuit of claim 11 wherein the adjustability of said timer is based on information contained within a data field of said header portion.

13. The circuit of claim 10 further comprising antenna selection circuitry for selecting, upon evaluation of said header portion obtained from a plurality of antennae, one of said plurality for receipt of the associated data portion of said header portion.

14. The circuit of claim 13 wherein the circuit is contained on a single monolithic device.

15. The circuit of claim 14 wherein said circuit acquires a unique word within said header portion and if no unique word is acquired within a predetermined period of time the circuit resets.

16. The circuit of claim 10 wherein the analog signal received is in the form of in-phase and quadrature components and the data within the signal is modulated using PN modulation and phase shift keyed modulation.

17. A direct sequence spread spectrum receiver, said receiver having a physical layer associated with the receiving of RF signals and a media access control (MAC) layer associated with the using of data within said RF signals, said physical layer comprising a single device having:

an analog receiver for receiving a spread spectrum modulated signal having a header portion and a data portion;

an analog-to-digital converter operable on said modulated signal;

a digital demodulator for binary phase shift keyed (BPSK) demodulation of said header portion and quaternary phase shift keyed (QPSK) demodulation of said data portion;

a timer for transitioning between the BPSK demodulation and the QPSK demodulation; and, an interface for providing the demodulated data signal to said MAC layer.

18. The receiver of claim 17 wherein the single device transmits the data from said physical layer to said MAC layer in a serial data stream.

19. The receiver of claim 18 wherein the single device is a single monolithic device.

20. The receiver of claim 17 wherein the data is modulated within the signals by both PN and phase shift keyed modulation.

* * * * *